United States Patent
Uchikawa

[11] Patent Number: 5,870,665
[45] Date of Patent: Feb. 9, 1999

[54] MOBILE SATELLITE COMMUNICATION TERMINAL

[75] Inventor: Setomi Uchikawa, Tokyo, Japan

[73] Assignee: NEC Corporation, Tokyo, Japan

[21] Appl. No.: 592,689

[22] Filed: Jan. 26, 1996

[30] Foreign Application Priority Data

Jan. 27, 1995 [JP] Japan ................................. 7-011338

[51] Int. Cl.$^6$ ................................................ H04B 7/15
[52] U.S. Cl. ........................................................ 455/11.1
[58] Field of Search .............................. 455/11.1, 12.1, 455/13.1–13.3, 33.1, 54.1, 56.1, 20, 90, 427, 575; H04B 7/15

[56] References Cited

U.S. PATENT DOCUMENTS 5,535,430  7/1996  Aoki et al. .............................. 455/54.1
5,535,432  7/1996  Dent ....................................... 455/12.1

OTHER PUBLICATIONS

R. Subramanian et al., "Inmarsat–M Portable MES", Pacific Telecommunications Council Fiteenth Annual Conference Proceedings, PTC 1993, vol. 11, pp. 835–840.

Primary Examiner—Richard Lee
Assistant Examiner—Vu Le
Attorney, Agent, or Firm—Ostrolenk, Faber, Gerb & Soffen, LLP

[57] ABSTRACT

In order that communication may be performed independently of indoors or outdoors, in this mobile satellite communication terminal, when it is used indoors, the indoor terminal transmitting and receiving a signal in the ground radio channel is connected to the repeater terminal installed at a position from which the satellite can be seen by the ground radio channel, further, the repeater terminal communicates with the satellite by using the satellite channel. On the other hand, when it is used outdoors, the outdoor terminal is constituted by mounting the outdoor unit for the satellite channel consisting of the antenna for the satellite channel and the radio frequency section instead of the indoor unit consisting of the antenna for the ground radio channel and the radio frequency section of the indoor terminal.

12 Claims, 4 Drawing Sheets

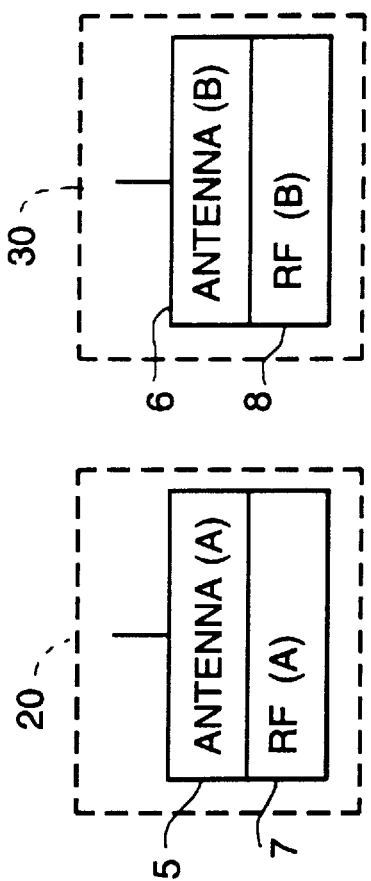
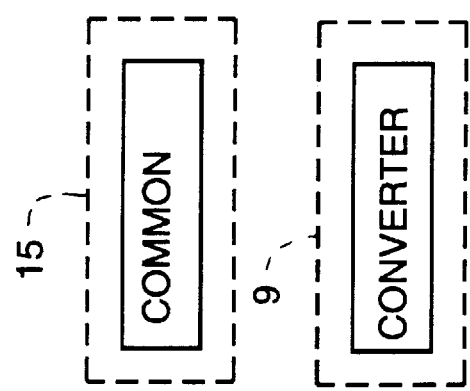
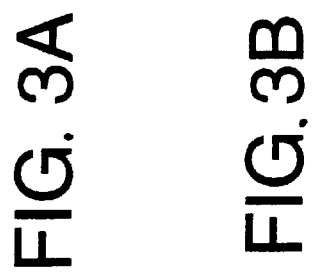
FIG. 3A  FIG. 3B  FIG. 3C  FIG. 3D

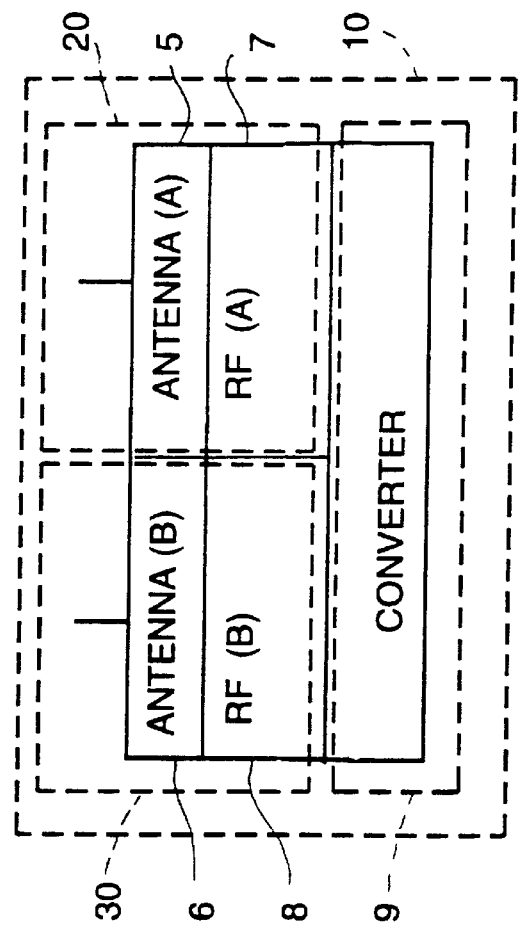
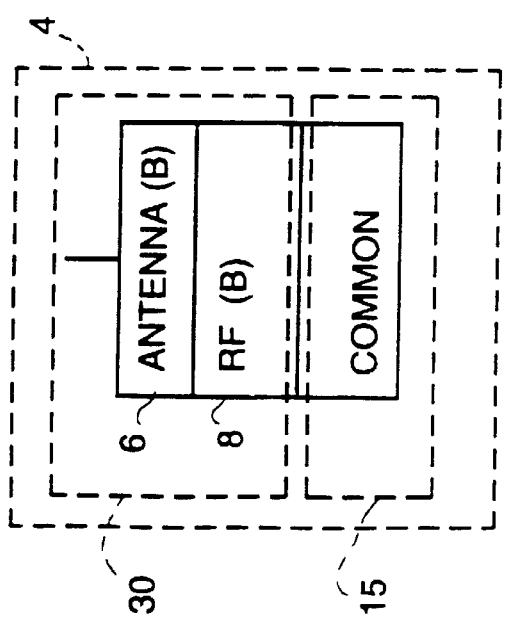
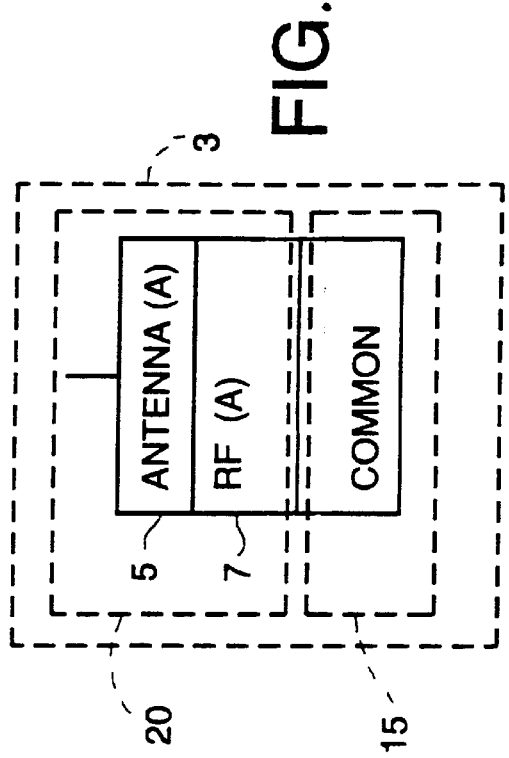

MOBILE SATELLITE COMMUNICATION TERMINAL

BACKGROUND OF THE INVENTION

The present invention relates to a mobile satellite communication terminal which is used for a mobile satellite communication system and is especially designed for satellite communication from indoors.

A conventional mobile satellite communication terminal is described in the following using FIG. 1 which shows a system diagram of the mobile satellite communication terminal.

The system of FIG. 1 includes a central earth station 1, plural mobile satellite communication terminals 40-1 to 40-3, and a satellite 2.

Terminals 40-1 to 40-3 are mobile satellite communication terminals having the structure, however they are placed in different positions. For example, terminal 40-1 is used outdoors, and is connected to central earth station 1 through satellite 2. Terminal 40-1 can communicate with the satellite 2 in a range of visibility even if the terminal is moved between mountains and buildings and the like.

Terminal 40-2 is located inside a building or the like. Communication by terminal 40-2 with satellite 2 can be performed at any a position from which satellite 2 can be seen, such as adjacent to window 21 provided in the building with a slight signal attenuation.

On the other hand, since terminal 40-3 is located at a position inside of the building and not near window 21, satellite 2 cannot be seen by terminal 40-3 and, transmitting and receiving signals to and from satellite 2 cannot be accomplished.

To communicate with satellite 2 using terminal 40-3, it must be moved to a place such as the window 21 or the like at which radio waves can be received.

As mentioned above, in the conventional mobile satellite communication system, communication cannot be performed when an obstacle is located between the mobile satellite communication terminal and the satellite.

Particularly, in a structure such as a building or the like, communication using the prior art terminals can be performed only from limited locations such as adjacent to a window and accordingly such terminals cannot be used with a high degree of freedom.

The above-mentioned mobile satellite communication system is described in documents "PTC 1993 proceedings, p. 835–p. 840" "INMARSAT-M PORTABLE MES".

SUMMARY OF THE INVENTION

An object of the present invention is to provide a mobile satellite communication terminal by which satellite communication can be freely utilized even if the mobile satellite communication terminal is placed inside a building from which a satellite cannot be seen.

The mobile satellite communication terminal of the present invention includes units which are attachable and detachable depending on whether the terminal is to be used indoors, outdoors or as a repeater terminal. The terminal includes a means by which an indoor radio signal is transmitted and received between a repeater terminal placed near a window and indoor terminal, a means by which the indoor radio signal is converted to a satellite radio signal and transmission and reception are performed between the satellite and the indoor terminal through the repeater terminal, and a means by which transmission and reception are performed between the satellite and an outdoors terminal by replacing the indoor unit by an outdoor unit when it is used outdoors.

BRIEF DESCRIPTION OF THE DRAWINGS

FIG. 3A, FIG. 3B, FIG. 3C and FIG. 3D show drawings of the attachable/detachable units forming the basic elements of the present invention.

FIG. 4A is a drawing showing the indoor terminal 4 constructed by combining the units of FIG. 3A and FIG. 3D.

FIG. 4B is a drawing showing the repeater terminal 10 constructed by combining the units of FIG. 3B, FIG. 3C and FIG. 3D.

FIG. 4C is a drawing showing the outdoor terminal 3 constructed by combining the units of FIG. 3A and FIG. 3C.

DESCRIPTION OF THE PREFERRED EMBODIMENTS

The mobile satellite communication terminal of the present invention is described with reference to the drawings.

Figure 1:
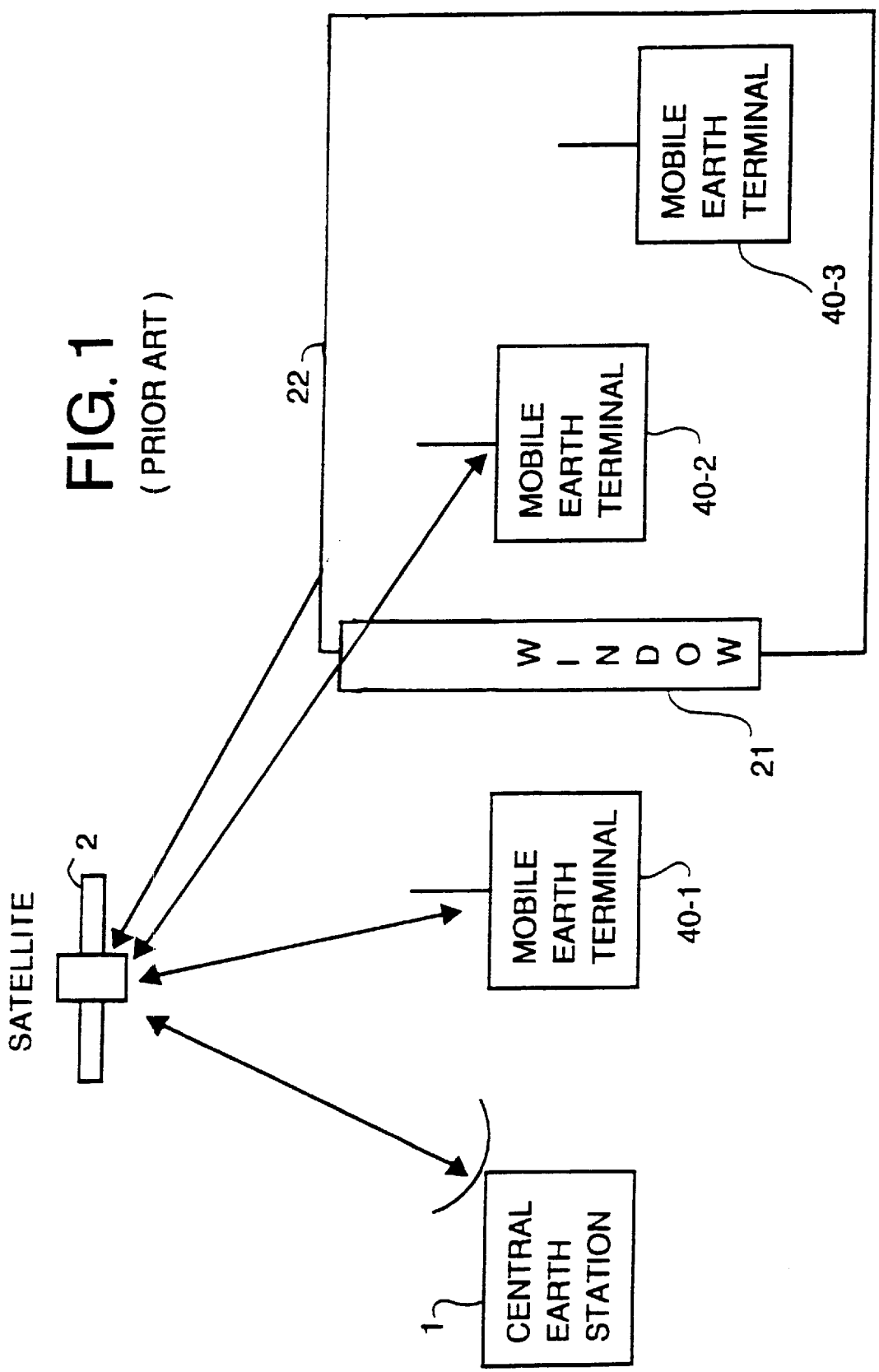
FIG. 1 shows a system diagram of the conventional mobile satellite communication system.
Figure 2:
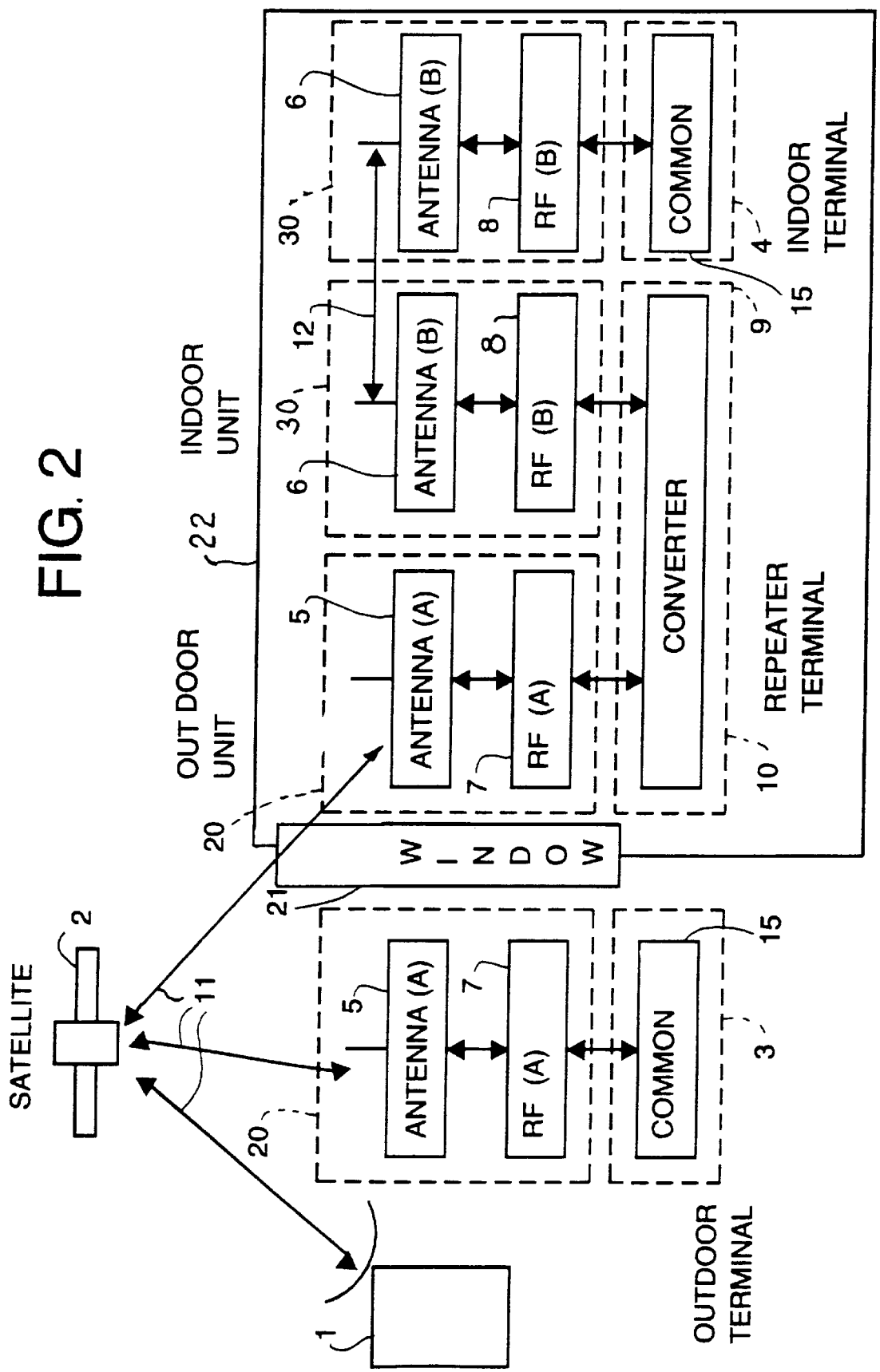
FIG. 2 shows a system diagram of the mobile satellite communication terminal of the present invention.

FIG. 2 depicts a system diagram of the mobile satellite communication terminal of the present invention.

FIG. 2 illustrates the three configurations of the mobile satellite communication terminal of the present invention. Mobile terminals 3 and 4 are connected to subscriber terminals such as a telephone, a facsimile, low speed data lines or the like. Repeater terminal 10 is responsible for transmitting, receiving and converting signals between satellite channel 11 and ground radio channel 12. In mobile terminals 3 and 4, the indoor unit 30 and the outdoor unit 20 are attachable and detachable from a common unit 15. The mobile terminals 3 and 4 are classified into two kinds of terminals indoor and outdoor depending on which different type of unit indoor 30 or outdoor 20 is attached to common unit 15. Mobile terminal 3, an outdoor terminal, contains an outdoor unit 20 for satellite communication and mobile terminal 4, an indoor terminal contains an indoor unit 30 for the radio channel communication.

Normally, a microwave band or a quasi-microwave band is used for communication with the satellite 2. Furthermore, modulation systems, for example, such as QPSK (Quadruple Phase Shift keying) or OQPSK (Offset Quadruple Phase Shift Keying) are used which can efficiently utilize a high frequency band and can also operate with a low C/N (Carrier to Noise ratio) ratio.

On the other hand, since a distance of the ground radio channel 12 between the repeater terminal 10 and the indoor terminal 4 is very short, in order to broaden directivity as much as possible, a comparatively low frequency band such as a VHF band or less is used. A modulation system, for example, FSK modulation and FM modulation are typically used for such ground based communication.

Since two different channels of communication are used, the terminals of the present invention are classified into the outdoor terminal 3 and the indoor terminal 4. The ground radio channel 12 is a channel which is used for indoor communication only, in which a comparatively low frequency (e.g. VHF band) is used, and out of sight communication can be performed.

The mobile satellite communication system shown in FIG. 2 is constituted by using the three different mobile satellite communication terminals described above.

Repeater terminal 10 is installed at a place from which the satellite 2 can be seen, for example, adjacent to window 21, in building 22 shown in FIG. 2.

Repeater terminal 10 includes an outdoor unit 20 which contains an antenna (A)5 which enables communication with the satellite 2 and a radio frequency circuit RF(A)7 for the satellite channel. Repeater terminal 10 also includes an indoor unit 30 which contains an antenna (B)6 and a radio frequency circuit RF(B)8 for the ground radio channel. Repeater terminal 10 further includes a converter section 9 which alternately converts signals of the satellite channel 11 and the ground radio channel 12. Indoor terminal 4 includes an indoor unit 30 and a common section 15, and communicates with the repeater terminal 10 by the ground radio channel 12.

On the other hand, the outdoor terminal 3 includes an outdoor unit 20, and the common section 15, and communicates with the satellite by satellite channel 11.

The following describes the operation of the mobile satellite communication terminal.

In the present invention, repeater terminal 10 is installed at a position from which satellite 2 can be seen to utilize satellite communication indoors. Repeater terminal 10 is provided with an outdoor unit 20 for satellite communication, an indoor unit 30 for the ground radio channel communication, and converter 9 for converting satellite and ground signals. For example, when a signal from satellite 2 is received, the signal from the satellite channel 12 is directly received by antenna (A)5 through window 21. After the signal is converted to a signal of the ground radio channel by converter 9, it is transmitted to the indoor terminal 4 using the ground radio channel 12. Consequently, even if indoor terminal 4 is located at a position from which the satellite 2 cannot be seen, satellite communication can be performed by indoor terminal 4 through repeater terminal 10.

The indoor terminal 4 is constructed from an indoor unit 30 for the ground radio channel 12 and the common section 15. The radio frequency section RF(B)8 performs the functions required for transmission and reception of a radio frequency signal on the ground radio channel 12. The common section 15 includes a modulation/demodulation function and a function for processing a baseband or the like. When a voice, a low-speed data signal or the like is desired to be transmitted from the indoor terminal 4 to the central earth station 1, first, a modulated signal is generated by a modulation/demodulation system in common section 15 and is outputted by the common section 15. Next, the modulated signal is converted to a carrier frequency (B) by the radio frequency section RF(B)8, and transmitted to the repeater terminal 10 by antenna (B)6. The repeater terminal 10 receives the transmitted signal by using its antenna (B)6. Receiving a signal from the indoor terminal 4, the conversion section 9 of repeater terminal 10 converts the carrier frequency (B) to a carrier frequency (A) which is a carrier wave for satellite communication, and converts the modulation/demodulation system (B) to a modulation/demodulation system (A) which is a modulation/demodulation system for satellite communication. An output signal of the conversion section 9 is transmitted to the satellite 2 on satellite channel 11 with the carrier frequency (A) and the modulation/demodulation system (A) by the antenna (A)5 being the satellite communication antenna.

When a signal is being sent to the indoor terminal 4, a modulated signal from the satellite 2 with the carrier frequency (A) and the modulation/demodulation system (A) is received by the repeater terminal 10. The signal received by the repeater terminal 10 is converted to a signal for the ground radio channel 12 with the carrier frequency (B) and the modulation/demodulation system (B), and transmitted to the indoor terminal 4. The indoor terminal 4 receives the signal from the repeater 10, and outputs the received signal.

The following discusses the operation of the mobile satellite communication terminal of the present invention when it is configured as the outdoor terminal 3.

An antenna (A)5 for satellite communication is included in the outdoor terminal 3 so that the satellite communication channel 11 can be utilized. As mentioned above, the mobile terminals have the same common element 15 independently of whether the terminal is an outdoor terminal 3 or an indoor terminal 4.

As mentioned above, the construction of the terminals may include different modulation/demodulation systems depending on whether the terminal uses, the ground radio channel 12, or the satellite channel 11. However, in order to simplify the construction of the terminals, the modulation/demodulation systems used for the ground radio channel or the satellite channel may be made the same.

FIGS. 3A–3D are drawings showing the attachable/detachable units which are the basic elements of the mobile satellite communication terminal of the present invention.

These Figures show the attachable/detachable units required for the outdoor terminal 3 and the indoor terminal 4. FIG. 3A shows the common section 15 having a function by which modulation/demodulation processing is performed with an IF band, and a base band signal processing function by which subscriber terminals are interfaced FIG. 3B illustrates the conversion section 9 having conversion functions of carrier frequencies (A), (B) and conversion functions of modulation/demodulation system (A), (B). FIG. 3C shows the outdoor unit 20 which includes the antenna section 5 which communicates with a transmission/reception frequency (A), and the RF section 7. FIG. 3D shows the indoor unit 30 which is provided with the antenna section (B)6 communicating with a transmission/reception frequency (B) for indoor communication, and the RF section (B)8.

The indoor unit 30 and the outdoor unit 20 are exchangeable units.

The outdoor unit 20 and the indoor unit 30 are interchangeably mounted to a common section 15. Common section 15 is connected to either indoor unit 20 or outdoor unit 30 by using a coaxial cable or a coaxial connector. In addition, the outdoor unit 20 and the indoor unit 30 can both be mounted together to the conversion section 9 to create a repeater terminal 10 as shown in FIG. 4C.

FIGS. 4A–4C are drawings showing the construction of the mobile satellite communication terminal of the present invention using the exchange units shown in FIG. 3A–3D.

FIG. 4A and FIG. 4B are drawings showing the structure of the indoor terminal 4 and the outdoor terminal 3, respectively in which the indoor unit 30 and the outdoor unit 20 are mounted to the common section 15.

FIG. 4C is a drawing showing structure of the repeater terminal 10 in which both of the outdoor unit 20 and the indoor unit 30 are mounted to the conversion section 9.

Therefore, it is clear that only one outdoor unit and two indoor units are required to communicate with the satellite 2 from an indoor location. Outdoors, only one outdoor unit has to be provided.

The above-mentioned outdoor terminal 3 is described so that it is used outdoors, but it is natural that the terminal 3 can be used indoors if it is installed at a position from which the satellite can be seen, for example, a place near a window. In the same way, it is natural that the indoor terminal and the repeater terminal can be used outdoors.

As mentioned above, in the mobile satellite communication terminal of the present invention, when it is used outdoors, the outdoor terminal 3 is constituted by combining the outdoor unit 20 and the common section, and when it is used indoors, the repeater terminal 10 is constructed by mounting the outdoor unit 20 and the indoor unit 10 to the conversion section 9. The indoor terminal 4 is constructed by combining the indoor unit 30 and the common section 15. Consequently, the indoor terminal 4 has performance by which mobility as the mobile terminal can be fully displayed.

Also, since both the repeater terminal 10 and the indoor/outdoor terminals can be matched, a flexible terminal can be provided.

What is claimed is:

1. A mobile satellite communication system for communicating with a satellite, the system comprising:
    an indoor terminal including a first detachable indoor unit which is detachably mounted to a common section, the common section providing a user interface to the system, the first detachable indoor unit including a first radio frequency circuit and a first antenna for communicating using a ground radio channel;
    a repeater terminal including a second detachable indoor unit and a first detachable outdoor unit which is detachably mounted to a conversion section, said second detachable indoor unit being substantially identical in construction to said first detachable indoor unit and including a second radio frequency circuit and a second antenna for communicating with said indoor terminal using said ground radio channel, said first detachable outdoor unit including a third radio frequency circuit and a third antenna for communicating with said satellite using a satellite channel, said conversion section converting signals between said ground radio channel and said satellite channel; and
    an outdoor terminal including a second detachable outdoor unit which is detachably mounted to a second common section, said second detachable outdoor unit being substantially identical in construction to said first detachable outdoor unit, and said second common section being substantially identical in construction to said first common section, said outdoor terminal communicating with said satellite using said satellite channel.

2. A mobile satellite communication system as recited in claim 1, wherein said detachable indoor and outdoor units are interchangeably attachable and detachable to said first and second common sections and said converter section.

3. A mobile satellite communication system as recited in claim 1, wherein said repeater terminal is installed at a position from which the satellite can be seen.

4. A mobile satellite communication system as recited in claim 3, wherein said conversion section alternately converts a transmission/reception frequency of the ground radio channel used by said detachable indoor unit and a transmission/reception frequency of the satellite channel used by said detachable outdoor unit.

5. A mobile satellite communication system as recited in claim 1, wherein both of said first and second common sections perform a modulation/demodulation function of a transmission/reception signal and perform a baseband processing function.

6. A mobile satellite communication system as recited in claim 1, wherein said ground radio channel uses a low frequency band such as a VHF band or less.

7. A mobile satellite communication system for communicating with a satellite the system comprising:
    at least two indoor units, each of said indoor units including a ground radio frequency circuit and a ground radio channel antenna for communicating with each other using a ground radio channel;
    an outdoor unit including a satellite radio frequency circuit and a satellite antenna for communicating with said satellite using a satellite channel;
    a common section providing a user interface to the system;
    a conversion section converting signals between said ground radio channel and said satellite channel and between said satellite channel and said ground radio channel;
    an indoor terminal including a first of said indoor units detachably mounted to said common section; and
    a repeater terminal including a second of said indoor units and said outdoor unit detachably mounted to said conversion section, whereby said indoor terminal communicates with said satellite through said repeater terminal.

8. A mobile satellite communication system as recited in claim 7, further comprising:
    an outdoor terminal including a second outdoor unit detachably mounted to a second common section, whereby said outdoor terminal communicates directly with said satellite.

9. A mobile satellite communication system as recited in claim 8, wherein both of said first and second common sections perform modulation/demodulation of a transmission/reception signal and perform a baseband processing function.

10. A mobile satellite communication system as recited in claim 7, wherein said repeater terminal is installed at a position from which the satellite can be seen.

11. A mobile satellite communication system as recited in claim 7, wherein said conversion section alternately converts a transmission/reception frequency of the ground radio channel used by said indoor unit and a transmission/reception frequency of the satellite channel used by said outdoor unit.

12. A mobile satellite communication system as recited in claim 7, wherein said ground radio channel uses a low frequency band such as a VHF band or less.

* * * * *